United States Patent [19]
Giddey et al.

[11] 3,973,044
[45] Aug. 3, 1976

[54] PROTEINACEOUS FOOD PRODUCT

[75] Inventors: Claude Giddey, Geneva; Willy Rufer, Onex, GE, both of Switzerland

[73] Assignee: Battelle Development Corporation, Columbus, Ohio

[22] Filed: May 3, 1974

[21] Appl. No.: 466,539

[30] Foreign Application Priority Data
May 11, 1973 Switzerland.......................... 6701/73

[52] U.S. Cl............................... 426/104; 426/656; 426/517
[51] Int. Cl.² ........................ A23G 1/00; A23J 3/00
[58] Field of Search ........... 426/364, 104, 144, 145, 426/512, 517, 506, 802, 656, 455

[56] References Cited
UNITED STATES PATENTS

| | | | |
|---|---|---|---|
| 2,132,690 | 10/1938 | Hilliard | 426/144 |
| 3,468,675 | 9/1969 | Potzl | 426/518 |
| 3,810,764 | 5/1974 | Waggle | 426/364 |
| 3,814,823 | 6/1974 | Yang | 426/506 |
| 3,840,679 | 10/1974 | Liepa | 426/362 |

Primary Examiner—Hiram H. Bernstein
Attorney, Agent, or Firm—Thomas W. Winland; Stephen L. Peterson

[57] ABSTRACT

The present invention is a proteinaceous food product and a method of its production. A mixture of protein and water is formed into a thin film between successive parallel rolls rotating in opposite directions and at sequentially increasing speeds so as to impart at least a 40% stretch to the film prior to removing the stretched film from the last roll with a blade set at an angle to the roll. The scraping off of the thin film forms a structure consisting of groups of many small folds interspersed on substantially larger folds. Compaction of this material creates a fibrous structure composed of the numerous small folds of material surrounded by a matrix of the material once comprising the larger folds. This compacted structure approximates the structure of natural meat where fibers are dispersed in a matrix of connective tissue. The volume percent of fibers in the product of the present invention can be altered to produce a strong and highly fibrous product or a weakly coherent structure consisting of a larger percentage of relatively homogenous matrix material.

13 Claims, 6 Drawing Figures

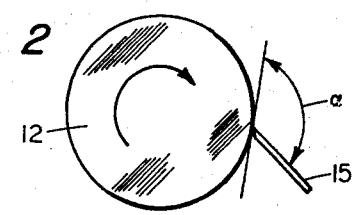
Fig. 2
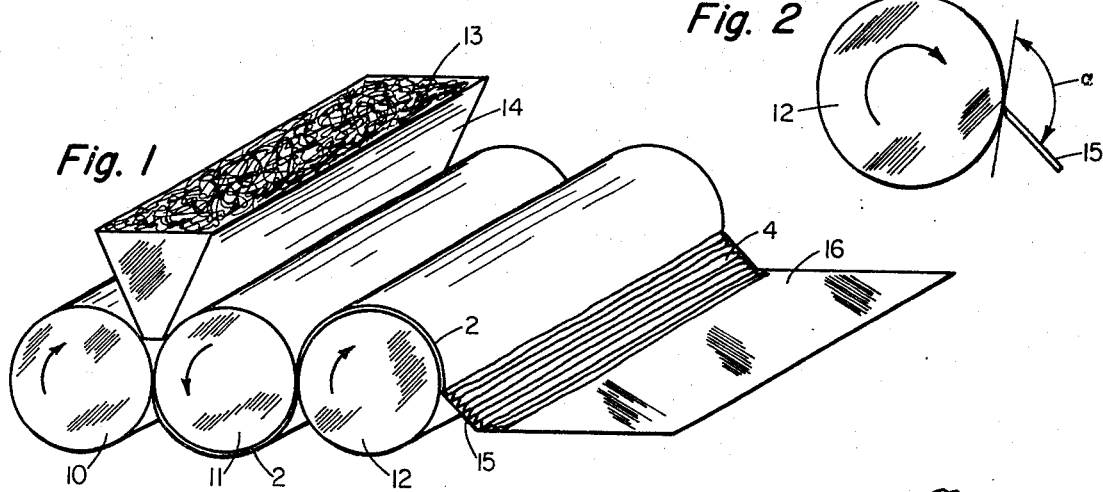
Fig. 1
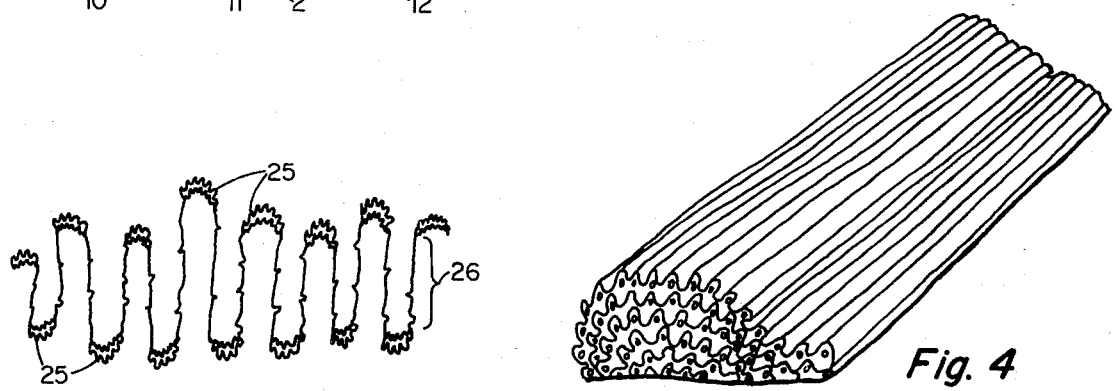
Fig. 3
Fig. 4
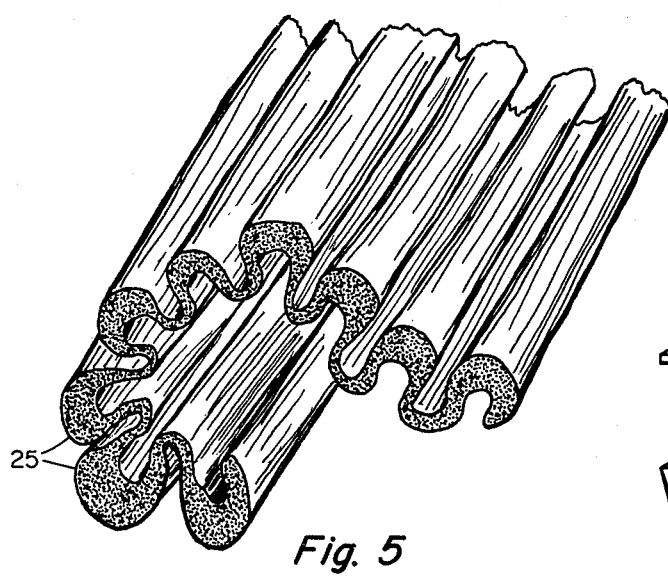
Fig. 5
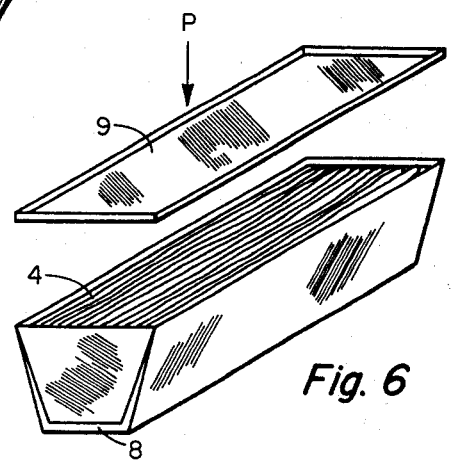
Fig. 6

PROTEINACEOUS FOOD PRODUCT

Background of the Invention

The present invention relates to the field in the art wherein protein is formed into a structure approximating the physical and organoleptic properties of natural meat. The present invention also relates to the production of a proteinaceous material having properties that are not the simulation of a natural protein product.

There are several prior art processes that fabricate protein food products with the intent of simulating the properties of meat. The fabrication of such food products presents a general problem in formation of a fibrous structure similar to natural meat products. In the absence of such meat-like structure, products having a proteinaceous base find little market demand as food products even though the product is composed of nutritious, edible protein due to the fact that the physical and organoleptic properties of the simulated product differ significantly from that of a natural meat product.

One prior art process consists of heating a proteinaceous mass composed of gluten, fat, cereals, and other components in a sealed container so as to coagulate the proteinaceous mass. The structure of a mass formed in that manner is not fibrous to a degree that upon mastication the product will give the impression of a natural meat-like structure.

U.S. Pat. No. 2,682,466 teaches a process of injecting a liquid mass containing protein through a plurality of orifices into a coagulating solution. The protein is thereby formed into a fibrous structure and the fibers are subsequently stretched and washed to remove the constituents of the coagulating solution. The fibers are then formed into a bulk structure by the introduction of a binder that may also contain coloring and flavoring agents.

Still another process known as "cooking-extrusion" consists of heating a mixture of soya meal and water containing flavoring agents while extruding the mixture by means of a screw-type extruder through a plurality of orifices. The extrusion process is carried out at high pressures (up to 20 atmospheres) and at a temperature in the range of from 100 to 150°C. These conditions cause the mixture to expand significantly as it exits the extruder to form an open porous structure. The product is then cut into pieces and dried. The product of such a process is intended for use by mixing with natural meat.

These prior art processes are relatively complex and require critical process control.

An additional prior art process is taught in German Patent Application No. OLS 2320782. In that reference a dough-like protein mix is formed into a film and creped by a blade. The creped film is subsequently compacted to form a solid product taught to resemble the consistency and flavor of meat. The product obtained from the basic process of this reference would seem to lack a fibrous consistency since many of the preferred embodiments are directed to means of producing a more fibrous structure. The structure produced by this process consists of numerous small parallel folds approximating the appearance of crepe paper. By contrast the present invention produced a folded structure having groups of smaller folds superimposed on the larger folds and therefore the fibrous property of the product is produced without additional process steps.

The purpose of the present invention is to make possible the simple and inexpensive formation of a food product having a protein base where the product has physical and organoleptic properties that closely approximate that of natural meat.

SUMMARY OF THE INVENTION

The present invention forms a proteinaceous food product closely approximating the structure of natural meat. A proteinaceous material is mixed so as to form a mixture of between 40 to 80 weight percent water. The mixture is then formed into a coherent thin film adherent to successive rolls rotating in opposite directions with successively increasing speeds imparting at least a 40% stretch to the film. The film is adherent to the roll having the larger surface speed and is thereby conveyed to a location where the film is removed and formed into the fibrous structure. A blade is applied to the last roll in the succession and the film is removed from the surface and formed into a structure consisting of a plurality of groups of small folds superimposed on larger folds. Upon compaction of the folded film, the groups of smaller folds compact to form a structure approximating the fibers in natural meat while the larger folds compact around the groups of smaller folds to form a matrix approximating the connective tissue in natural meat. By altering the process parameters the structure of the resultant product can be controlled by controlling the relative amounts of the groups of smaller folds to the amount of larger folds.

BRIEF DESCRIPTION OF THE DRAWINGS

FIG. 1 shows one embodiment of the present invention where the film is formed between successive rolls rotating in opposite directions at speeds increasing from left to right so as to stretch the film during formation.

FIG. 2 illustrates the orientation of the doctor blade where such an embodiment is used to scrape the film from one of the rolls.

FIG. 3 is a cross section of the product subsequent to the scraping operation, illustrating the superimposition of groups of smaller folds on the folded structure.

FIG. 4 illustrates a view of a representative product of the present process.

FIG. 5 is an enlargement of a portion of FIG. 4.

FIG. 6 schematically illustrates an embodiment used to compact the film into the final product structure.

DETAILED DESCRIPTION OF THE INVENTION

The present invention is characterized by the fact that a mixture of an edible proteinaceous material and water is formed into a thin coherent film and stretched in excess of 40%. The stretched film is removed from a solid substrate to which it is adherent with a blade so as to form a series of folds having groups of smaller folds superimposed thereon. When such a structure is compacted, it yields a structure similar in physical and organoleptic properties to that of natural meat.

A preferred embodiment of the present invention would have the thin coherent film stretched on the substrate by the rotation of successive forming rolls at successively increased speeds. In this preferred embodiment it is also preferred that the means used to remove the stretched film be placed at right angles to the motion of the film, i.e., with the edge of the blade parallel to the axis of rotation of the final roll.

FIG. 1 illustrates one embodiment for carrying out the present invention where the proteinaceous mixture is formed on a solid substrate consisting of a series of cylindrical rolls having parallel axes of rotation. The rolls 10, 11, and 12 are in contact, two by two, pressing against each other with a force making possible relative sliding of the contact surfaces. The direction of rotation of the rolls are opposite each adjacent roll in the series with rolls 10 and 11 rotating away from the source 14 of proteinaceous material 13. The surface velocities of the rolls are determined by their rotational speeds and in this embodiment the surface velocity of roll 10 is smallest with roll 11 at an intermediate velocity and roll 12 at the greatest surface velocity of the three rolls. Since the thin film 2 formed between rolls 10 and 11 will adhere to roll 11 because of its greater surface velocity it should be obvious that the film will be sequentially adherent to roll 11 and then roll 12 where the film 2 is ultimately scraped from the surface of the final roll 12 by the action of a scraper 15. The product 4 so formed is then supported by any convenient means here illustrated as a simple planar support 16. It should be obvious that the support 16 could be a conveyor-like apparatus to carry the product 4 to a different location for further process steps. The different surface velocities of the plurality of rolls must necessarily be of magnitudes in excess of that needed merely to transfer the film to the next successive roll. The magnitude of the difference in surface speeds must be such that just prior to removal of the film adherent the last roll the film should have been stretched in excess of 40%. While we do not wish to be bound by theory we believe the elastic energy stored in the stretched film adherent to the roll is responsible for the formation of the groups of smaller folds formed upon removal of the stretched adherent film from the roll.

The necessity of stretching the film places a constraint on the required properties of the proteinaceous mix in that it must have sufficient elasticity to withstand at least a 40% stretch. Particular success has been experienced where such a mix has a water content of from 40 to 80 weight percent.

An apparatus that is particularly suited for use with the present invention is of a type usually used as a dough (paste) grinder, having for example three parallel rolls, the surfaces of which are coated with a layer of polished stainless steel, in contact two by two under the action of a pressure force which allows relative sliding of their contact surfaces. Each of the contiguous rolls is rotated in opposite directions, with the speeds of rotation increasing from the first to the third roll, the characteristics of those rolls used in the same manner in each of the Examples being the following:

| | |
|---|---|
| Diameter of the rolls: | 9.8 cm |
| Length of the rolls: | 29.5 cm |
| Speed of rotation: | |
| 1st roll: | 34 rpm |
| 2nd roll: | 63 rpm |
| 3rd roll: | 118 rpm |

The difference in speeds of rotation between the first two rolls being 85.3% and between the second and third rolls being 87.3% for a total difference of 172.6% or approximately 173%. The assumption is made that this cumulative percentage difference approximates the stretching of the film so produced and therefore for all the Examples the film was stretched approximately 173%.

The axes of rotation of the rolls being horizontal, the mixture is introduced from the top between the first and the second rolls. A scraper is firmly applied, with its edge being horizontal, against the third roll, near the generatrix of that roll which is diametrically opposed to that which is in contact with the second roll.

The form of the film that makes the product an advance over the art is created when the film is scraped from the roll. The scraping member should, when applied to the stretched film adherent to the roll, remove the film forming a plurality of folds comprised of larger folds having a plurality of smaller folds in groups superimposed on the larger folds. FIG. 3 shows a structure meeting the above description. What is meant by larger and smaller when describing the folds is the relative amplitude of the folds when the folds are considered as wave forms. Particular success has been experienced using a rigid sharp blade in contact with the roll. The desired product form consisting of the folded structure results when a sharp blade contacts the roll at an angle between 130 and 160 degrees from a plane tangent the roll surface at the location where the blade contacts the roll. Particular success has been experienced when the angle is approximately 150°.

The angle is illustrated in FIG. 2 as α.

The surface of the cylindrical roll need not be of any special material, however, it is preferred to have the surface be a polished surface preferably, though not necessarily, metal.

Due to the required stretching of the film the physical properties of the proteinaceous mixture affect the final form and in general the proteinaceous mixture should have a water content in the range of from 40 to 80 weight percent. It is preferred that at least 40 weight percent of the proteinaceous mixture consist of at least one edible protein. The thin film on the roll surface is a coherent mass and therefore forces applied to one portion of the film will result in relatively uniform deformation of the continuous film as opposed to local deformation of a film comprised of a plurality of individual particles. The thickness of the coherent film before scraping affects the final structure and it is preferred but not necessary to have the thickness less than 1 millimeter.

The product so formed by scraping is illustrated in FIGS. 3, 4, and 5, and is best described as a thin film of nonporous proteinaceous material having a plurality of groups of smaller folds 25 interspaced with larger folds 26. The final product closely approximates the physical and organoleptic properties of natural meat because when the folded film is compacted the groups of smaller folds form fiberous members in the bulk product while the larger folds compact to form a matrix surrounding the groups of smaller folds now fiberous in form. The product shown in FIG. 4 differs from that of FIG. 5 and 6 in that the number of smaller folds 25 superimposed on the larger folds 26 is larger in FIGS. 5 and 6. The resultant product has been found to have excellent physical and organoleptical properties where the average amplitude of the smaller folds is in the range of from approximately 0.1 to 0.5 millimeters and although that range is a preferred embodiment, the average amplitude of the smaller folds may be outside that range to obtain various final product structures. While the present invention is most applicable to a simulated meat product, the parameters of the process can be altered to obtain products of different properties. When it is desired to make a simulated meat structure that must be strongly coherent, the volume percent of fibers (hence compacted groups of smaller folds) must be relatively large in comparison to that of the matrix material.

The compaction of the folded structure is carried out at relatively low pressures 1 kg/cm$^2$ being a pressure sufficient to cause compaction into the relatively dense final structure without destroying the fiberous structure. One means of compacting the folded structure is illustrated schematically in FIG. 6. It consists of a container 8 having a lid 9 on which pressure can be applied to the folded structure 4.

It should be noted that the term fiberous or fiber as used in the specification does not connote a different composition for the material comprising a fiber than that of the matrix. The many groups of small amplitude folds when compacted give a physical structure similar to a fiberous material since the groups of small amplitude folds are surrounded by a matrix of relatively unfolded material formed by the large amplitude folds.

The fiberous structure of the product can be retained throughout the process by subjecting the product to a stabilizing treatment. The treatment may be either thermal, chemical or a combination of both. The thermal treatment can be carried out in a liquid medium (preferably water) at a temperature in the range of from 50° to 90°C, in steam at a temperature in the range of from 100 to 120°C or in a moisture free atmosphere at a temperature in the range of from 80° to 130°C. The heating process may also be utilized during the compaction step of the process and further may be used to sterilize the product. The chemical treatment can be the contacting of the product with an aqueous acid solution. Particular success has been experienced using acetic acid solutions at a pH in the range of from 2.5 to 4.5. The chemical treatment may also consist of exposure of the product to various tanning solutions. Specific tanning solutions that may be used include the aldehydes as for example formaldehyde, a polyphenol such as resorcinol or a mineral salt of a heavy metal. Obviously if the final product is to be edible any chemical used to alter the product must either be edible in itself or completely removed from the product subsequent to the desired treatment.

Such chemical and thermal treatments can be classified as protein insolubilization treatments and such treatments may be applied to the product at any point in the process where it is desired to affect the properties of the protein structure.

The proteinaceous material used in the present invention may be of animal or vegetable origin as for example meat residue, proteinaceous milk products, fish meal and proteinaceous vegetable extracts. Particular success has been experienced using protein of animal origin such as casein, fish meal protein, lactalbumin, collagen and muscular meat or offal protein. Proteinaceous materials of vegetable origin particularly suited to the present invention include proteinaceous extracts from seed kernels of oil containing plants, cereals, or legumes including soya, ground nuts, rape, cotton, peas, lupine, and sunflower. Particular success was experienced using a powder of defatted soya oil cake, in which the soya protein is isolated at its isoelectric point at a pH of 7 and subsequently adjusted to 5.9.

In order to give the final product the desired organoleptic properties as well as consistency and color and in addition to improve the product's ability to resist deterioration, various additives can be added to the proteinaceous mixture. The properties of the product can be altered with additions of fat, gelatin (and gelatinizing agents), sodium chloride, sodium pyrophosphate, sodium polyphosphate, flavoring agents, coloring agents, carbohydrates and antibacterial agents. The percentage of dry material in the proteinaceous mixture can be varied according to the nature of the additives used and the desired properties of the final product. Preferably the dry material in the mixture will be from 20 to 60 weight percent. In addition, to avoid separation of water during forming of a mixture having a dry material content of approximately 40 weight percent small amounts of sodium pyrophosphate and sodium polyphosphate may be added.

DESCRIPTION OF THE PREFERRED EMBODIMENTS

The present invention was utilized in the following specific examples:

EXAMPLE 1

A proteinaceous mixture of the following composition was produced:

| | Weight Percent |
|---|---|
| Water | 57.0 |
| Casein rennet (containing 90% protein by weight) | 29.0 |
| Fat | 8.0 |
| NaCl | 1.2 |
| Mixture of pyrophosphates and of polyphosphates of sodium | 0.9 |
| Flavorings and Seasonings | 3.9 |
| Food coloring agents | traces. |
| | 100.0 |

In a 100 gram mixture the 0.9 gram (weight percent) sodium pyrophosphates and polyphosphates had the following composition by weight:

"Fondagil 6" : 36.35%
"Fondagil 10" : 36.35%
"Fondagil 12" : 27.30%

("Fondagil 6", "Fondagil 10" and "Fondagil 12" are trademarks of the firm Progil, covering mixtures of bisodium pyrophosphate, tetra-sodium pyrophosphate and sodium pentapolyphosphate). They were added with 1.2 grams of sodium chloride and traces of food coloring agents to 57 grams of water.

Separately, there were mixed 8 grams of hydrogenated vegetable fat, which had first been melted by heating at 50°C, with 3.9 grams of food flavoring agents and seasonings.

The latter mixture was introduced into the aqueous solution, forming an emulsion which was homogenized by compression in a piston homogenizer, under a pressure of 50 Kg per square centimeter. Subsequently 29 grams of rennet casein were mixed into the homogenous emulsion so as to form a mixture which has the appearance of a moist powder.

The mixture was then introduced into the apparatus of FIG. 1 with the external surface of the rolls covered with a layer of polished stainless steel. The operating parameters of the rolls were identical to the parameters given in the previous description of the apparatus, and therefore the amount the film was stretched in this and all the following Examples was approximately 173%.

The mixture was introduced between the first and second roll and after forming in the rolls it was collected by means of a sharp blade applied at relatively high pressure to the third roll. The edge of the blade was applied at an angle of 150° in the manner shown in FIG. 2. The formed product had the appearance of the product in FIG. 3 with a thickness of approximately 1 millimeter and an average amplitude of the smaller folds of approximately 0.1 to 0.5 millimeter. The product so formed was placed in a container and subjected to 1 Kg/cm² of pressure for 15 minutes at room temperature.

The compacted product in the form of a solid, coherent block was removed from the container and placed inside a skin type covering. The covered product was then subjected to a 24 hour smoking treatment normally used for ham. Finally the smoked product was heated for 30 minutes in a water bath at 70°C. The treated product had the appearance, texture, consistency and organoleptic characteristics of a piece of natural smoked ham.

It was found that such a product could be preserved for several months without deterioration in the same manner as meat and sausage products. Exposure to refrigerated surroundings at 10°C at a relative humidity between 70 to 80% has proved successful. The product may be stored in bulk form, or pre-sliced, or in vacuum tight containers or frozen.

EXAMPLE 2

A proteinaceous mixture of the following composition was produced:

| | Weight Percent |
|---|---|
| Water | 50 |
| mixture containing 90%, by weight, of soya protein in powder form (separated by extraction at pH 7, precipitated at its isoelectric point, the pH of which has been adjusted to 5.9 after separation, and worked, by drying by pulverization, into a dry fine powder) and 10% of residues from soya meal (product known on the market as Promine D 90%, 'Promine' being a trademark of Central Soya) | 35 |
| Fat | 10.0 |
| NaCl | 1.6 |
| Gelatin | 1.0 |
| Flavorings and Seasonings | 2.4 |
| Food coloring agents | Traces. |

A 100 gram mixture was made by dissolving 1 gram of gelatin in 50 grams of water at 40°C along with 1.6 grams of NaCl and the food coloring. Separately 10 grams of hydrogenated vegetable fat melted at 50°C was mixed with the 2.4 grams of flavorings and seasonings.

The two solutions were mixed into an emulsion and homogenized in a piston homogenizer at a pressure of 50 Kg/cm². The soya protein was added to the homogenized mixture to yield a proteinaceous mixture having the appearance of a damp powder. The proteinaceous mixture was then formed and treated in the same manner as Example 1 to obtain a similar product.

EXAMPLE 3

A proteinaceous mixture of the following composition was produced:

| | Weight Percent |
|---|---|
| Water | 48.5 |
| Mixture containing 90% by weight of soya protein in powder form (separated by extraction and precipitation at its isoelectric point, the pH of which has been adjusted to 5.9 after separation and which, by drying by pulverization, has been put into a dry fine powder) and 10% of residues obtained from soya meal (a product known on the market as Promine D 90%) | 48.5 |
| Flavorings and seasonings | 3.0 |
| Food coloring agents | Traces. |

A mixture having a total weight of 100 grams was made by mixing 3 grams of the flavoring and seasoning with the soya (48.5 grams) to form a mass having the appearance of damp powder. The water (48.5 grams) and coloring were then added and formed in the manner of Example 1. After stretching the film the normal 173% and forming the typical folded structure the mass was compacted at 1 Kg/cm² for 15 minutes at room temperature.

Subsequently the solid product was removed from the mold and cut into cubic pieces having an edge length of 3 centimeters. The pieces were then heated for 10 minutes at 90° to 100°C with dry steam. Finally the pieces were treated in dry air at 35°C until their moisture content reached approximately 4 weight percent.

The final product had the appearance of dried meat and was easily reconstituted by heating in boiling water or sauce so as to form a product simulating beef stew.

EXAMPLE 4

A proteinaceous mixture of the following composition was produced:

| | Weight Percent |
|---|---|
| Water | 43.0 |
| Soya oil cake, defattened and ground | 52.5 |
| Wheat gluten | 2.5 |
| Flavorings and seasonings | 2.0 |
| Food flavoring agents | Traces |

The soya oil cake had the following composition:

| | Weight Percent |
|---|---|
| Water | 5 to 8 |
| Proteins | 52 |
| Fat (ether extract) | 1.0 |
| Raw fibers (maximum) | 3.0 |
| Lecithins (Phosphatides) | 2.20 |

The ingredients were mixed in a 100 gram mixture by dry mixing 52.5 grams of the ground soya oil cake with 2.5 grams of wheat gluten and the 2 grams of seasoning. That initial mixture was added to 43 grams of water containing the food coloring. The total mixture was subjected to 10 minutes of a mixing and grinding treatment that had the effect of stretching the gluten.

The product was treated in the manner of Example 3 and the product closely resembled that obtained in Example 3.

EXAMPLE 5

A proteinaceous mixture containing 59 weight percent lean ground meat and 41 percent defatted soya meal (having the same composition as the soya oil cake of Example 4) were stretched and formed in the three roll apparatus of the previous Examples. After compaction into the bulk product under approximately 1 Kg/cm² the solid product was cut into cubic pieces and introduced to a can with a seasoned sauce. The can was evacuated of air, sealed and heated to 120°C for 30 minutes. The canned product had the appearance, consistency and organoleptic properties of natural meat pieces.

EXAMPLE 6

A proteinaceous mixture consisting of 360 grams of casein and 50 grams of ham aroma (International Flavors and Fragrances, Reinach, Switzerland) was produced by mixing for 10 minutes in a Hobart mixer. Subsequently 100 grams of melted pork fat was added and the mixing continued for an additional 5 minutes. In addition 15 grams of salt, 11 grams of sodium phosphate and the coloring in 700 grams of water were added and the mixing was continued for an additional half an hour.

The mixture was subjected to the forming process according to the procedure of Example 1 and after compaction at 1 Kg/cm² the product was cooked to yield an excellent simulation of meat.

EXAMPLE 7

A mixture consisting of 300 grams of ground meat was formed and treated in the manner of the mixture in Example 1. After compaction the product was fried and the fibrous structure due to the groups of folds was present in the meat after cooking.

While the present invention has been disclosed by specific example there may be embodiments not herein specifically disclosed but within the skill of the artisan to devise in view of this teaching. The scope of the present invention is not intended to be limited other than by the appended claims.

For example while smooth or polished rolls are preferred it may be in some instances desirable to roughen the surface or provide grooves therein to promote adhesion of the mixture to the roll.

The process is shown in a manner that may infer the folded film need be continuous but such is not the case. The quality of the end product does not suffer in any way if the folded film is broken or irregular.

One set of velocities of the rolls and therefore the stretch of the film has been specifically taught and one set of values has been used throughout the examples. It should not be inferred that those particular speeds are the only operable embodiment. They were kept constant in the various examples to make evaluation of other process parameters more meaningful. It should also be noted that the number of rolls may exceed three and in fact such a configuration is desirable when forming mixes having a low dry mass content as for example meat residue having a water content of about 60 weight percent.

We claim:

1. In a process of forming a proteinaceous product comprising:
   a. preparing a mixture of protein and water;
   b. forming the mixture into a film by passing the mixture between a series of smooth parallel and adjacent rotating rolls, where the film transfers sequentially from one roll to the next roll,
   c. providing each roll in the sequence with (1) a greater surface speed than the preceding roll and (2) a direction of rotation opposite to that of the preceding roll; and
   d. removing the film from the last of the series of rolls by a blade placed at an angle to the surface of the last roll, the improvement of:
   i. preparing a protein and water mixture having a water content of from 40 to 80 weight percent;
   ii. imparting a stretch to the film at least in part by rotating each successive roll at a surface speed greater than the preceding roll, wherein the sum of speed differentials between successive rolls is in excess of 40 percent; and
   iii. forming two superimposed sets of fold structures in the film as it is removed by the blade with the smaller set of folds being superimposed on the larger folds.

2. The process of claim 1 wherein said film is removed from said final roll by a blade inclined at an angle between 160° and 130° from a plane tangent to said final roll where said blade contacts said final roll.

3. The process of claim 1 wherein said film has a thickness less than 1.0 millimeter.

4. The process of claim 1 wherein at least three rolls are utilized with said mixture being introduced between two of said rolls, said two rolls rotating in opposite directions away from a source of said mixture with the second of said rolls having a greater surface velocity than the first roll, said second roll coacting with a third roll rotating opposite said second roll at a surface velocity greater than that of said second roll, said film being sequentially adherent to the roll having the greater surface velocity and scraping said film ultimately from the surface of the final roll.

5. The process of claim 1 wherein at least 40 weight percent of said mixture consists of at least one edible protein.

6. The process of claim 1 wherein proteinaceous material in said mixture is subjected to a protein insolubilization treatment at any point in the process.

7. The process of claim 6 wherein said insolubilization treatment consists of a chemical or thermal treatment.

8. The product made by the process of claim 1.
9. The product made by the process of claim 2.
10. The product made by the process of claim 3.
11. The product made by the process of claim 4.
12. The product made by the process of claim 5.
13. The product made by the process of claim 6.

* * * * *